United States Patent [19]
Brown et al.

[11] Patent Number: 5,939,490
[45] Date of Patent: Aug. 17, 1999

[54] COMPOSITIONS OF POLY(PHENYLENE ETHER) RESINS AND EPOXY-FUNCTIONAL POLYOLEFINS

[75] Inventors: Sterling Bruce Brown, Schenectady; John Robert Campbell, Clifton Park, both of N.Y.; Chorng-Fure Robin Hwang, Cary, N.C.; Steven Thomas Rice, Scotia, N.Y.; Patric A. Rodgers, Clifton Park, N.Y.; James Joseph Scobbo, Jr., Slingerlands, N.Y.; John Bennie Yates, Glenmont, N.Y.

[73] Assignee: General Electric Company, Pittsfield, Mass.

[21] Appl. No.: 08/873,826

[22] Filed: Jun. 12, 1997

Related U.S. Application Data

[63] Continuation of application No. 08/674,936, Jul. 3, 1996, abandoned, which is a continuation of application No. 08/485,250, Jun. 7, 1995, abandoned.

[51] Int. Cl.$^6$ ...................................................... C08L 71/12
[52] U.S. Cl. ................................ 525/68; 525/65; 525/71; 525/132; 525/391; 525/396; 525/397
[58] Field of Search ................................ 525/68, 65, 71, 525/132, 391, 396, 397

[56] References Cited

U.S. PATENT DOCUMENTS

| | | | |
|---|---|---|---|
| 3,361,851 | 1/1968 | Gowen | 524/508 |
| 3,379,792 | 4/1968 | Finholt | 525/397 |
| 4,315,086 | 2/1982 | Ueno et al. | 525/391 |
| 4,454,284 | 6/1984 | Ueno et al. | 524/427 |
| 4,461,871 | 7/1984 | Kometani et al. | 525/166 |
| 4,654,405 | 3/1987 | Jalbert et al. | 525/391 |
| 4,746,708 | 5/1988 | Sybert | 525/392 |
| 4,797,453 | 1/1989 | Taubitz et al. | 525/397 |
| 4,816,515 | 3/1989 | Weiss | 525/63 |
| 4,873,286 | 10/1989 | Gallucci et al. | 525/397 |
| 4,914,153 | 4/1990 | Togo et al. | 525/68 |
| 5,258,455 | 11/1993 | Laughner et al. | 525/68 |

FOREIGN PATENT DOCUMENTS

| | | |
|---|---|---|
| 33 00 232 A1 | 2/1982 | Germany. |
| 0 268 486 A2 | 5/1988 | Japan. |
| 467 261 A2 | 1/1992 | Japan. |
| 0 648 810 A1 | 4/1995 | Japan. |

*Primary Examiner*—Mark L. Warzel

[57] ABSTRACT

Compositions are provided for compatibilized blends comprising compatibilizing poly(phenylene ether) resins and epoxy-functional polyolefins that exhibit improved resistance to delamination while providing high impact strength and other improved physical properties. Articles made from the compositions are useful for automotive lighting and under hood components.

31 Claims, No Drawings

COMPOSITIONS OF POLY(PHENYLENE ETHER) RESINS AND EPOXY-FUNCTIONAL POLYOLEFINS

This is a continuation of of application Ser. No. 08/674,936 filed on Jul. 3, 1996, now abandoned which is a continuation of Ser. No. 08/485,250 filed on Jun. 7, 1995 now abandoned.

BACKGROUND OF THE INVENTION

1. Field of the Invention

This invention relates to blends of compatibilizing poly(phenylene ether) resins and epoxy-functional polyolefins. The blends exhibit enhanced properties, such as improved impact and delamination resistance.

2. Brief Description of the Related Art

Poly(phenylene ether) resins (referred to hereafter as "PPE") are commercially attractive materials because of their unique combination of physical, chemical, and electrical properties. Furthermore, the combination of these resins with polyolefins has been sought after for additional overall properties such as chemical resistance, high strength and high flow. For example, U.S. Pat. No. 4,454,284 describes blends of PPE and copolymers of ethylene with glycidyl esters of acrylic acid or methacrylic acid (e.g., epoxy-functional polyolefins) wherein the ratio of PPE to epoxy-functional polyolefin ranges from 99.5:0.5 to 0.5:99.5. The properties of these blends can be further enhanced by the addition of various additives such as rubbery polymers, flame retardants, stabilizers, and reinforcing materials.

The physical properties of blends comprising PPE and epoxy-functional polyolefins make them attractive for a variety of end-use articles in the automotive market, especially for lighting and under hood components. Many of these components are manufactured by processes such as injection molding or blow molding which require that the material be resistant to delamination in order to obtain a final part with acceptable surface appearance and part integrity. Unfortunately, compositions of the prior art are not sufficiently compatible and thus, do not possess delamination resistance and are unacceptable for these manufacturing techniques.

It is apparent that a need exists for compatible blends comprising PPE and epoxy-functional polyolefins that have improved delamination resistance and which possess other important properties, such as impact and tensile strength.

SUMMARY OF THE INVENTION

The needs discussed above have been satisfied by the surprising discovery of an improved thermoplastic composition which comprises:

a) a compatibilizing poly(phenylene ether) resin; and b) an epoxy-functional polyolefin.

In preferred embodiments, the present invention provides compatibilized PPE-polyolefin compositions that are free of visual signs of delamination, have improved phase morphology stabilization and possess good impact and tensile properties. The description that follows provides further details regarding this invention.

DETAILED DESCRIPTION OF THE INVENTION

PPE, per se, are known polymers comprising a plurality of structural units of the formula (I):

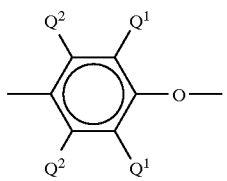

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. The PPE intrinsic viscosity is most often in the range of about 0.15–40.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling, and typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present especially in a copper-halide secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

It is necessary for at least some of the PPE to be "compatibilizing PPE." Compatibilizing PPE are sometimes referred to as "functionalized PPE." In the final blend, the compatibilizing or functionalized PPE is commonly referred to as a "compatibilized PPE" because of the resultant improved compatibility between the compatibilizing PPE and the other components. Accordingly, appropriate compatibilizing PPE's are those which affect the compatibility of the PPE with the various components of the blend (e.g., the PPE and an epoxy functional polyolefin). Compatibility is meant to include the stabilization of gross phase separation between the components of the blend. Indicators of improved compatibilization include, for example, increased tensile properties, reduced delamination tendency, increased ductility and/or improved phase morphology stabilization. It is through the effect of improving the compatibility of the blend components which determines, in part, the desirable physical properties of the blend.

One way to prepare an appropriate compatibilizing PPE is to functionalize the PPE by reacting the PPE with at least one compound having both:

(i) a carbon-carbon double bond or a carbon-carbon triple bond, and (ii) at least one species selected from the group consisting of carboxylic acid, acid anhydride, acid amide, imido, carboxylic acid ester, epoxy, amino, hydroxyl or carboxylic acid ammonium salt. These compounds are sometimes referred to as compatibilizers or functionalizers. Illustrative compounds used to accomplish the functionalization of the PPE include maleic anhydride, funaric acid, maleimides such as N-phenylmaleimide and 1,4-phenylene-bis-methylene-$\alpha,\alpha'$-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Examples of such typical reagents for preparing a useful compatibilizing PPE are described in U.S. Pat. Nos. 4,315,086, 4,755, 566, and 4,888,397, which are incorporated herein by. reference.

Non-polymeric aliphatic polycarboxylic acids are also useful for preparing an appropriate compatibilizing PPE. Included in the group of species, also known as compatibilizers or functionalizers, are, for example, the aliphatic polycarboxylic acids, acid esters and acid amides represented by the formula (II):

$$(R^{I}O)_{m}R(COOR^{II})_{n}(CONR^{III}R^{IV})_{s} \qquad (II)$$

wherein R is a linear or branched chain, saturated aliphatic hydrocarbon of from 2 to 20, preferably 2 to 10, carbon atoms; $R^{I}$ is selected from the group consisting of hydrogen or an alkyl, aryl, acyl or carbonyl dioxy group of 1 to 10, preferably 1 to 6, most preferably 1 to 4, carbon atoms, with hydrogen being especially preferred; each $R^{II}$ is independently selected from the group consisting of hydrogen or an alkyl or aryl group of from 1 to 20 carbon atoms preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero; and wherein ($OR^{I}$) is alpha or beta to a carbonyl group and at least two carbonyl groups are separated by 2 to 6 carbon atoms. Obviously, $R^{I}$, $R^{II}$, $R^{III}$ and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative of acid esters useful herein include, for example, acetyl citrate and mono- and/or di-stearyl citrates and the like. Suitable acid amides useful herein include, for example, N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Examples of suitable functionalizing compounds can be found in U.S. Pat. Nos. 4,315,086, 4,755,566, 4,873,286 and 5,000,897, all of which are incorporated herein by reference.

Amine-functionalized PPE are also useful as compatibilizing PPE in the present invention. Suitable amine-functionaized PPE can be made, for example, by the reaction of an anhydride or epoxy containing PPE with a diamine as described in U.S. Pat. No. 4,746,708, which is incorporated herein by reference. Suitable amine-functionalized PPE may also be prepared by the reaction of PPE with an $\alpha$-chloro, $\omega$-aminoalkane as described in EP 476,619. An amine functionalized PPE may also be prepared by heating PPE with various amine containing disulfides, such as for example, diaminodiphenyldisulfide. Typically, the PPE and the disulfide can be melt processed together with, for example, an extruder or similar melt mixing device.

The amount of the above mentioned compatibilizers that are required to appropriately functionalize the PPE is that which is sufficient to improve the compatibility between the various components in the composition. As previously discussed, indications of improved compatibility include resistance to delamination, improved physical properties such as increased tensile and/or impact properties and/or a stabilized morphology between the blend component phases under static or low shear conditions. It is thought that reactions can occur between some of the components of the composition, for example, between the compatibilizing PPE and the epoxy-functional polyolefins which result in the formation of PPE-polyolefin copolymers. It is believed that the PPE-polyolefin copolymers are in part responsible for many of the property changes which are observed in compositions containing a compatibilizer present in an effective amount when compared to the same composition not containing a compatibilizer or containing a compatibilizer in an amount which is not effective to improve the compatibility between the blend components. An effective amount of the above mentioned compatibilizers based on the amount of the PPE is generally up to about 8% by weight, and is preferably from about 0.05% to about 4% by weight In the most preferred embodiments, the amount of the compatibilizer is in the range of about 0.1% to about 1.5% by weight based on the amount of the PPE. Depending on a variety of factors such as the reactivity of the functionalized polyolefin resin and the reactive moieties on the compatibilizer as well as the overall properties desired, the amount of compatibilizer may be adjusted without undue experimentation. When the level of reactivity it too great, some of the properties may detrimentally suffer. For example, if the level of functionality is too great on the PPE for a given functionalized polyolefin resin, the sample may become too viscous to be molded. In this case, the functionality on the PPE can be reduced by dilution with PPE. Conversely, if the degree of compatibility is insufficient, the level of functionality can be increased by either using less PPE or a greater amount of the compatibilizer.

Another useful method for preparing an appropriate compatibilizing PPE resin involves reacting a PPE with a compound containing an acyl functional group and a species capable of reacting with an epoxy-functional polyolefin. Species capable of reacting with an epoxy-functional polyolefin include, for example, carboxylic acids, alcohols, thiols, amines, amides, anhydrides, and the like. Non-limiting examples include chloroformyl succinic anhydride, chloroethanoyl succinic anhydride, trimellitic anhydride acid chloride, 1-acetoxy-acetyl-3,4-dibenzoic acid anhydride, and terephthalic acid acid chloride. Additional examples and methods to prepare such compatibilizing PPE can be found in U.S. Pat. Nos. 4,600,741 and 4,642,358, each of which is incorporated herein by reference.

Epoxy-functional polyolefins are another element of the present invention. Examples of useful polyolefinic compounds include copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (III):

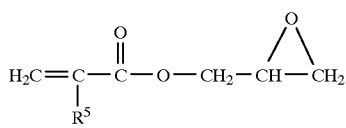

(III)

wherein $R^5$ represents a hydrogen atom or a lower alkyl group, typically $C_1$-$C_{10}$. Examples of the glycidyl esters of α,β-unsaturated acids include glycidyl acrylate, glycidyl methacrylate and glycidyl ethacrylate. The epoxy-functional polyolefin is preferably an olefinic copolymer containing about 60% to about 99.5% by weight of an α-olefin and about 0.5% to about 40% by weight of a glycidyl ester of an α,β-unsaturated carboxylic acid, preferably about 3% to about 30% by weight When the amount of glycidyl ester is less than about 0.5% by weight, little or no discernible effects are observed and the resultant blend has essentially the same properties as though the polyolefin was nonfunctionalized. To the contrary, when it exceeds about 40% by weight, gelation occurs during melt-blending with the compatibilizing PPE to damage the extrusion stability, moldability and mechanical properties of the product It is also possible to blend the epoxy-functional polyolefin with various non-functionalized polyolefins provided that the epoxy-functional polyolefin is added in an amount sufficient to afford a composition with improved compatibility between the PPE components and the polyolefin components. Non-functionalized polyolefins useful in the present invention include, for example, low density polyethylene, high density polyethylene, linear low density polyethylene, medium density polyethylene, polyoctenomer, polypropylene, impact modified polypropylene, polypropylene copolymers such as ethylene-propylene copolymers, ethylene-propylene-diene copolymers and polymers and copolymers of longer chain length olefins. Various mixtures of polyolefins can also be used.

Suitable copolymers or terpolymers for the epoxy-functional polyolefin include, for example, ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylateglycidyl methacrylate terpolymers. The preferred epoxy-functional polyolefins are available from Sumitomo Chemical Co., Ltd. under the trademarks IGETABOND and BONDFAST and from Elf Atochem under the trademark LOTADER.

The ratio of the compatibilizing PPE or mixture of compatibilizing PPE with non-functionalized PPE to epoxy-functional polyolefin or mixture of epoxy-functional polyolefin and non-epoxyfunctional polyolefin can vary from about 99:1 to 1:99, depending on the requirements that the composition must meet The preferred range is generally from about 15–95% by weight of the compatibilizing PPE or mixture of compatibilizing PPE with non-functionalized PPE and about 5–85% by weight of the epoxy-functional polyolefin or mixture of epoxy-functional polyolefin and non-epoxyfunctional polyolefin. The exact composition can be determined without undue additional experimentation depending on the physical properties desired.

In combining a composition comprising a compatibilizing PPE and an epoxy-functional polyolefin, it was surprisingly found that the molded test parts showed no signs of delamination on visual inspection and had very good impact resistance as indicated by notched Izod impact strengths in excess of about 1.5 foot-pounds/inch. Additionally, compositions containing, based on the total weight of the composition, in excess of about 60 parts by weight compatibilizing PPE to about 40 parts by weight of epoxy-functional polyolefin had ultimate tensile elongation values in excess of 100%, no visual sign of delamination and had notched Izod impact strengths in excess of 5 foot-pounds/inch.

It was also surprisingly found that the compatibilizing PPE could be diluted with non-compatibilizing (i.e., non-functionalized) PPE to adjust the viscosity of the blend composition with the epoxy-functional polyolefin. This discovery allows for a master batch of compatibilizing PPE to be prepared and admixed with non-compatibilizing PPE and epoxy-functional polyolefin, in addition to other ingredients, to make a family of similar compositions having a range of viscosities made from common starting materials to meet a variety of end-use requirements for the final compositions.

Additionally, it was surprisingly discovered that by combining a compatibilizing PPE and epoxy-functional polyolefins, it was possible to obtain a composition that had a marked improvement in chemical resistance to common automotive solvents over comparative compositions wherein either or both the PPE and the polyolefin were not functionalized or were insufficiently functionalized to improve the compatibility between the components. Thus, according to another embodiment of the invention, a compatibilizing PPE is used in combination with the epoxy-functional polyolefins to obtain superior chemical resistance.

The compositions of the present invention may also contain at least one impact modifier. The preferred impact modifiers are block (typically diblock, triblock, or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various block copolymers are also sometimes useful. The weight average molecular weights of the impact modifiers are typically in the range of about 50,000 to 300,000. Block copolymers of this type are commercially available from Shell Chemical Company under the trademark KRATON, and include grades D1101, D1102, G1650, G1651, G1652, G1701 and G1702.

Another class of impact modifiers is derived from conjugated dienes. While copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. The impact modifier may also contain reactive groups such as acid, oxazoline, amino, epoxy, or anhydride. Various mixtures of impact modifiers may also be utilized.

The amount of the impact modifier present, when one is used, is generally an amount effective to improve the overall ductility of the composition. Improvements in ductility can be indicated by increases in tensile elongation, Izod or falling dart impact strengths. The amount of the impact modifier is generally in the range of about 1% to about 15% by weight based on the total weight of the composition. The preferred range is generally about 1% to about 10% and the most preferred range is generally about 3% to about 8% by weight; based on the total weight of the composition. Determination of the exact amounts and types of impact modifiers utilized is determined, at least partly, by the requirements that the composition must meet.

The compositions of the present invention may also contain a flow promoter, for example, at least one polymer of an alkenylaromatic compound. Suitable polymers of this type may be prepared by methods known in the art including bulk, suspension and emulsion polymerization. They generally contain at least 25% by weight of structural units derived from an alkenylaromatic monomer of the formula (IV):

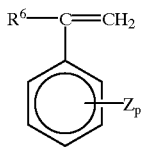

(IV)

wherein $R^6$ is hydrogen, lower alkyl or halogen; Z is vinyl, halogen or lower alkyl; and p is from 0 to 5. These resins include homopolymers of styrene, cblorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Various mixtures of flow promoters may also be utilized.

The amount of the flow promoter present, when one is used, is generally in the range of about 0.01% to about 20% by weight based on the total weight of the composition. The preferred range is generally about 0.01% to about 15% by weight and the most preferred range is generally about 0.1% to about 12% by weight; based on the total weight of the composition. Determination of the exact amounts and types of flow promoters utilized is determined, at least partly, by the requirements that the composition must meet.

The polymer mixture according to the invention may also comprise a non-elastomeric metal salt having a melting temperature lower than the compounding temperature of the polymer mixture with the exception of metal salts of dihydrocarbyldithiophosphinic acid. It is of importance for the melting temperature of the metal salt to be lower than the compounding temperature of the polymer mixture; when the melting temperature is equal to or higher than the compounding temperature, the metal salt is less effective for improving the mechanical properties. The compounding temperature is the temperature at which the constituents of the polymer mixture according to the invention are mixed to a more or less homogeneous mass in the melted condition or a similar condition.

The compounding temperature generally is above about 250° C., usually between approximately 260° and 290° C.

Suitable metal salts are inorganic or organic salts, more preferably metal salts of organic acids. Suitable organic acids are saturated and unsaturated aliphatic carboxylic acids, aromatic carboxylic acids, aliphatic and aromatic sulphonic or phosphonic acids and salts of alkyl hydrogen sulfates. Mixtures of various salts can also be utilized. The organic part of the salts preferably has a molecular weight below about 500, more preferably below about 300.

Specific organic acids include, but are not restricted to: benzoic, palmitic, lauric, acetic, stearic, gluconic, as well as dodecyl benzene sulphonic acids.

Suitable metal salts may be taken from a broad range of metals provided that the salt has a melting temperature lower than the polymer mixture compounding temperature. Metals such as calcium, aluminum and zinc are preferred but this does not preclude metals such as sodium, lithium, potassium, barium, beryllium, magnesium, copper, cobalt, and iron. In particular, metal salts of stearic acid are preferred.

The amount of the metal salts present, when one is used, is generally in the range of about 0.01% to about 20% by weight based on the total weight of the composition. The preferred range is generally about 0.01% to about 5% by weight and the most preferred range is generally about 0.1% to about 2% by weight; based on the total weight of the composition. Determination of the exact amounts and types of metal salts utilized is determined, at least partly, by the requirements that the composition must meet.

The addition of reinforcing fillers is also contemplated for the compositions of the present invention. Suitable reinforcing fillers are those which increase the rigidity of the composition. Amongst these, fibrous materials are preferred, in particular glass fibers made from low alkali E-glass, having a fiber diameter of from about 8 μm to about 14 μm, the length of the glass fibers in the finished injection molding being from 0.01 mm to 0.5 mm. The glass fibers may be employed as rovings or as chopped or milled glass fibers, and may be provided with a suitable finish and an adhesion promoter or promoter system based on silanes. The amount of reinforcing fillers, based on the total weight of the composition, is generally from about 5 to about 60% by weight, a preferred range is generally from about 10% to about 40% by weight.

However, other fibrous reinforcing materials, e.g. carbon fibers, K titanate single-crystal fibers, gypsum fibers, aluminum oxide fibers or asbestos may also be incorporated.

Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler generally can range from 0% to about 50% by weight based on the total weight of the entire composition.

Not only can the impact modifiers, flow promoters, metal salts and reinforcing filler additives mentioned above be used in the compositions of the present invention, but the compositions can also include effective amounts of at least one additive selected from the group consisting of flame retardants, drip retardants, dyes, pigments, colorants, stabilizers, antistatic agents, and lubricants. These additives are known in the art, as are their effective levels and methods of incorporation. Effective amounts of the additives vary widely, but they are usually present in an amount from about 0.1% to 50% by weight, based on the weight of the entire composition.

PPE-polyolefin blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with one of the primary polymer components, PPE and epoxy-functional polyolefins. It appears that certain properties, such as impact strength and elongation, are sometimes enhanced by initially precompounding the PPE with at least one of the typical agents used to functionalize PPE prior to blending with the epoxy-functional polyolefin. It also appears that some physical properties can be enhanced by adding the metal salt to the composition after at least some of the compatibilizing PPE and epoxy-functional polyolefins have been mixed. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt Those of ordinary skill in the art will be able to adjust blending times and temperatures, as well as component addition location and sequence, without undue additional experimentation.

The present compositions should be understood to be substantially free of other thermoplastic resins such as polycarbonates, polyamides, polyesters, polyetherimides, polysulfones, and the like. It should also be clear that improved molded articles prepared from the compositions of the present invention represent an additional embodiment of this invention.

The following examples are provided to illustrate some embodiments of the present invention. They are not intended to limit the invention in any aspect.

EXAMPLES

The compositions of Tables 1, 2 and 3 were extruded on a twin-screw extruder using a set temperature of about 250–290° C. and about 10–30 inches Hg vacuum applied to the melt during compounding. The resultant compositions were molded using an injection molding machine using a temperature set of about 290–350° C. and a mold temperature of about 70–100° C. Molded test specimens of the compositions were subjected to measurement of notched Izod impact strength according to ASTM D256 (employing a sample size of 2.5 inch by 0.5 inch by 0.125 inch), and tensile yield and tensile elongation at break according to ASTM D638 using type V test specimens. Delamination was determined by visual inspection.

The materials used in the following compositions were:

PPE is poly(2,6-dimethylphenylene ether) resin having an intrinsic viscosity of about 0.46 dl/gm measured in chloroform at 25° C., obtained from GE Plastics.

PPE-VV is extruded PPE utilizing a vacuum vent on the extruder with about 10–30 inches Hg vacuum applied to the melt during compounding. The PPE-VV was dried at about 110° C. prior to use.

PPE-FA is a compatibilizing PPE prepared by extruding 2% by weight fumaric acid with PPE followed by dissolving the extrudate in hot toluene and precipitation by treatment with methanol. The PPE-FA was dried at about 110° C. prior to use.

PPE-CA is a compatibilizing PPE prepared by extruding 3% by weight citric acid with PPE. The PPE-CA was dried at about 110° C. prior to use.

PPE-amine is an amine functionalized PPE prepared by extruding PPE with diaminodiphenyldisulfide.

E-PO is (polyethylene-co-12% glycidyl methacrylate) obtained as BONDFAST E from Sumitomo Chemical Co., Ltd.

PP is a medium impact polypropylene obtained from the Exxon Co. under the product tradename ESCORENE grade PD8092.

The components in the examples are percentages by weight based on the total weight of the composition, unless otherwise noted. All parts are parts by weight.

TABLE 1

|  | 1 | 2 | 3 | 4 | 5 | 6 |
|---|---|---|---|---|---|---|
| SAMPLE: | | | | | | |
| PPE | 90 | 0 | 45 | 40 | 30 | 45 |
| PPE-FA | 0 | 90 | 45 | 40 | 30 | 0 |
| PPE-amine | 0 | 0 | 0 | 0 | 0 | 45 |
| E-PO | 10 | 10 | 10 | 20 | 40 | 10 |
| PROPERTIES: | | | | | | |
| delamination | YES | ** | NO | NO | NO | NO |
| notched Izod; ft-lb/in | * | ** | 5.9 | 10.0 | 4.3 | 5.4 |
| tensile yield; psi | * | ** | 8241 | 6794 | 2010 | 8614 |

TABLE 1-continued

|  | 1 | 2 | 3 | 4 | 5 | 6 |
|---|---|---|---|---|---|---|
| tensile strength; psi | * | ** | 8618 | 7680 | 2045 | 9702 |
| ultimate elongation; % | * | ** | 130 | 134 | 36 | 144 |

*Sample delaminated on molding.
**Sample too viscous to mold.

As seen by the data in Table 1, sample 1 is the control blend of the prior art containing a non-functionalized PPE with an epoxy-functional polyolefin. This sample delaminated upon injection molding into test parts and could not be properly tested for physical properties. In contrast, samples 3–6 containing the compatibilizing PPE showed no subjective signs of delamination.

Sample 2, containing only a carboxylic acid/anhydride functionalized PPE as the compatibilizing PPE had a melt viscosity that was too high for injection molding. This result is consistent with the theory that the compatibilizing PPE undergoes a reaction with the epoxy-functional polyolefin to make a PPE-polyolefin copolymer. In this sample, the copolymer is presumably at such a high level that the viscosity of the composition is too high for injection molding. Compositions with a high level of copolymer can, however, be useful for other fabrication processes, for example, extrusion, blow molding and thermoforming.

Samples 3, 4, 5 and 6 are illustrative of the excellent physical properties that can be obtained with blends comprising functionalized PPE and an epoxy-functional polyolefin of varying ratios and types. The level of functionality in the PPE was adjusted by diluting the functionalized or compatibilizing PPE with non-functionalized PPE to provide an acceptable viscosity in the final composition appropriate for injection molding. Another embodiment of the present invention is to prepare a masterbatch of compatibilizing PPE that can be diluted with non-functionalized PPE to allow for a range of viscosities in the final composition. The exact composition would, of course, depend on the desired properties needed for the ultimate end-use application. It is also possible to begin with a level of functionality on the PPE such that dilution with non-functionalized PPE is not utilized.

TABLE 2

|  | 7 | 8 | 9 | 10 | 11 | 12 |
|---|---|---|---|---|---|---|
| SAMPLE: | | | | | | |
| PPE-VV | 40 | 40 | 40 | 0 | 0 | 0 |
| PPE-CA | 0 | 0 | 0 | 40 | 40 | 40 |
| PP | 60 | 60 | 60 | 60 | 60 | 60 |
| E-PO | 0 | 5 | 10 | 0 | 5 | 10 |
| PROPERTIES: | | | | | | |
| delamination | YES | YES | YES | YES | NO | NO |
| notched Izod; ft-lb/in | 0.7 | 0.8 | 1.0 | 0.6 | 1.6 | 2.4 |
| tensile strength; psi | 2900 | 2750 | 2630 | 2860 | 2640 | 2590 |
| tensile modulus; kpsi | 95.5 | 88.8 | 81.0 | 94.3 | 84.3 | 73.6 |
| ultimate elongation; % | 14 | 18 | 26 | 14 | 34 | 43 |

The samples in Table 2 correspond to a 40:60 weight ratio of PPE to a medium impact polypropylene comparing the addition of 0, 5 and 10 parts by weight of an epoxy-functionalized polyolefin. Sample 7 is a control and illustrates the poor physical properties obtained with an uncompatibilized blend of the PPE and polypropylene components. Samples 8 and 9 are also controls demonstrating the poor physical properties obtained utilizing a non-functionalized or non-compatibilizing PPE but with the addition of an epoxy-functionalized polyolefin resin.

Sample 10 demonstrates a control composition utilizing a functionalized PPE but without the epoxy-functionalized polyolefin resin. Samples 11 and 12 are illustrative of the present invention, wherein the improved physical properties, especially impact and tensile properties, are evident with the combination of the functionalized PPE and the epoxy-functional polyolefin.

TABLE 3

|  | 13 | 14 | 15 | 16 | 17 |
|---|---|---|---|---|---|
| SAMPLE: | | | | | |
| PPE-VV | 20 | 20 | 0 | 0 | 0 |
| PPE-CA | 0 | 0 | 20 | 20 | 20 |
| PP | 80 | 80 | 80 | 80 | 80 |
| E-PO | 0 | 10 | 0 | 5 | 10 |
| PROPERTIES: | | | | | |
| delamination | YES | YES | YES | NO | NO |
| notched Izod impact ft-lb/in | 1.1 | 1.4 | 1.5 | 2.6 | 4.2 |
| tensile strength; psi | 2720 | 2560 | 2780 | 2660 | 2530 |
| tensile modulus; kpsi | 81.4 | 68.9 | 82.8 | 75.8 | 68.2 |
| ultimate elongation; % | 51 | 101 | 70 | 91 | 269 |

The samples in Table 3 correspond to a 20:80 weight ratio of PPE to a medium impact polypropylene comparing the addition of 0, 5 and 10 parts by weight of an epoxy-functionalized polyolefin. Samples 13, 14 and 15 are control formulations which illustrate the poor physical properties obtained with uncompatibilized blends of the PPE and polypropylene components. Samples 14 and 15 are controls demonstrating the poor physical properties obtained utilizing either a compatibilizing PPE or an epoxy-functionalized polyolefin resin but not both together in the same composition. All of the control samples show some signs of laminar structures when parts are impacted or broken.

Samples 16 and 17 are illustrative of the present invention, wherein the improved physical properties, especially impact and tensile properties, are evident with the combination of the compatibilizing PPE and the epoxy-functional polyolefin. The samples containing the compatibilizing PPE, polypropylene and epoxy-functional polyolefin are free of any visible signs of lamination.

What is claimed:

1. A composition comprising:
   (A) a poly(phenylene ether) resin comprising a compatibilizing poly(phenylene ether) resin, wherein the compatibilizing poly(phenylene ether) resin comprises a poly(phenylene ether) resin and a compound selected from the group consisting of citric acid, malic acid, agaricic acid, esters of polycarboxylic acids, amides of polycarboxylic acids, and salts of polycarboxylic acids, and
   (B) an epoxy-functional polyolefin;
   wherein said composition is free of polyamide.

2. The composition of claim 1, wherein the epoxy-functional polyolefin is copolymer of an α-olefin with a glycidyl ester of an α,β-unsaturated carboxylic acid.

3. The composition of claim 1, wherein component (A) is present from about 15% to 95% by weight and component (B) is present from about 5% to 85% by weight; based on the total weight of components A and B.

4. The composition of claim 1, wherein the compatibilizing poly(phenylene ether) resin is present in an amount sufficient to improve the compatibility between the various components of the composition.

5. The composition of claim 4, further consisting essentially of at least one non-epoxyfunctional polyolefin.

6. The composition of claim 5, wherein the non-epoxyfunctional polyolefin is selected from the group consisting of low density polyethylene, high density polyethylene, linear low density polyethylene, medium density polyethylene, polypropylene, impact modified polypropylene, polyethylene copolymers, polypropylene copolymers, and polyoctenomer.

7. The composition of claim 6, wherein the epoxy-functional polyolefin is present in an amount sufficient to improve the compatibility between the various components of the composition.

8. The composition of claim 7, wherein, based on the total weight of the composition, the sum of the amount of the poly(phenylene ether) resin and the compatibilizing poly(phenylene ether) resin is from about 15% to 95% by weight and the sum of the epoxy-functional polyolefin and non-epoxyfunctional polyolefin is present from about 5% to 85% by weight.

9. The composition of claim 1, further comprising at least one additive selected from the group consisting of impact modifiers, non-elastomeric metal salts, flow promoters, flame retardants, drip retardants, dyes, pigments, colorants, stabilizers, antistatic agents, plasticizers, fillers, and lubricants.

10. The composition of claim 1, wherein the compatibilizing poly(phenylene ether) resin and epoxy-functional polyolefin are present in sufficient amounts to afford a composition having no visual sign of delamination.

11. The composition according to claim 10, further having an ultimate tensile elongation value in excess of 30% and a notched Izod impact strength in excess of 2 foot-pounds/inch.

12. An article made from the composition of claim 1.

13. A method to prepare the composition of claim 1 comprising:
 (1) preblending a functionalizing agent with a poly(phenylene ether) resin to make a compatibilizing poly(phenylene ether) resin, and
 (2) admixing said compatibilizing poly(phenylene ether) resin with a mixture comprising an epoxy-functional polyolefin.

14. The composition of claim 1 wherein the compound is citric acid.

15. A composition consisting essentially of a poly(phenylene ether) resin, a compatibilizing poly(phenylene ether) resin, wherein the compatibilizing poly(phenylene ether) resin comprises a poly(phenylene ether) resin and a compound selected from the group consisting of citric acid, malic acid, agaricic acid, esters of polycarboxylic acids, amides of polycarboxylic acids, and salts of polycarboxylic acids, an epoxy-functional polyolefin, and optionally, a non-epoxyfunctional polyolefin, wherein said composition is free of polyamide.

16. A composition consisting of:
 (A) a poly(phenylene ether) resin comprising a compatibilizing poly(phenylene ether) resin, wherein the compatibilizing poly(phenylene ether) resin comprises a poly(phenylene ether) resin and a compound selected from the group consisting of citric acid, malic acid, agaricic acid, esters of polycarboxylic acids, amides of polycarboxylic acids, and salts of polycarboxylic acids,
 (B) an epoxy-functional polyolefin, and
 (C) optionally, further consisting of at least one additive selected from the group consisting of impact modifiers, non-elastomeric metal salts, flow promoters, flame retardants, drip retardants, dyes, pigments, colorants, stabilizers, antistatic agents, plasticizers, fillers, and lubricants.

17. The composition of claim 16, wherein the compound is citric acid.

18. The composition of claim 16, wherein the epoxy-functional polyolefin is copolymer of an α-olefin with a glycidyl ester of an α,β-unsaturated carboxylic acid.

19. The composition of claim 16, wherein component (A) is present from about 15% to 95% by weight and component (B) is present from about 5% to 85% by weight; based on the total weight of components A and B.

20. The composition of claim 16, wherein the compatibilizing poly(phenylene ether) resin is present in an amount sufficient to improve the compatibility between the various components of the composition.

21. The composition of claim 16, further consisting of at least one non-epoxyfunctional polyolefin.

22. The composition of claim 21, wherein the non-epoxyfunctional polyolefin is selected from the group consisting of low density polyethylene, high density polyethylene, linear low density polyethylene, medium density polyethylene, polypropylene, impact modified polypropylene, polyethylene copolymers, polypropylene copolymers, and polyoctenomer.

23. The composition of claim 16, wherein the epoxy-functional polyolefin is present in an amount sufficient to improve the compatibility between the various components of the composition.

24. The composition of claim 23, wherein, based on the total weight of the composition, the sum of the amount of the poly(phenylene ether) resin and the compatibilizing poly(phenylene ether) resin is from about 15% to 95% by weight and the sum of the epoxy-functional polyolefin and non-epoxyfunctional polyolefin is present from about 5% to 85% by weight.

25. The composition of claim 16, wherein the compatibilizing poly(phenylene ether) resin and epoxy-functional polyolefin are present in sufficient amounts to afford a composition having no visual sign of delamination.

26. The composition according to claim 16, further having and ultimate tensile elongation value in excess of 30% and a notched Izod impact strength in excess of 2 foot-pounds/inch.

27. An article made from the composition of claim 16.

28. A method to prepare the composition of claim 16 comprising:
 (1) preblending a functionalizing agent selected from the group consisting of citric acid, malic acid, agaricic acid, esters of polycarboxylic acids, amides of polycarboxylic acids, and salts of polycarboxylic acids with a poly(phenylene ether) resin to make a compatibilizing poly(phenylene ether) resin, and
 (2) admixing said compatibilizing poly(phenylene ether) resin with a mixture comprising an epoxy-functional polyolefin.

29. The composition of claim 16, wherein said composition is free of polyamide.

30. A composition consisting of a poly(phenylene ether) resin, a compatibilizing poly(phenylene ether) resin, an epoxy-functional polyolefin, optionally, a non-epoxyfunctional polyolefin, and optionally, further consisting of at least one additive selected from the group consisting of impact modifiers, non-elastomeric metal salts, flow promoters, flame retardants, drip retardants, dyes, pigments, colorants, stabilizers, antistatic agents, plasticizers, fillers, and lubricants, wherein the compatibilizing poly(phenylene ether) resin comprises a poly(phenylene ether) resin and a compound selected from the group consisting of citric acid, malic acid, agaricic acid, esters of polycarboxylic acids, amides of polycarboxylic acids, and salts of polycarboxylic acids.

31. The composition of claim 30, wherein said composition is free of polyamide.

* * * * *